United States Patent
Chan et al.

(10) Patent No.: US 7,229,690 B2
(45) Date of Patent: Jun. 12, 2007

(54) MICROSPHERES INCLUDING NANOPARTICLES

(75) Inventors: YinThai Chan, Cambridge, MA (US); John P. Zimmer, Cambridge, MA (US); Moungi G. Bawendi, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/898,554

(22) Filed: Jul. 26, 2004

(65) Prior Publication Data

US 2006/0019098 A1   Jan. 26, 2006

(51) Int. Cl.
*B32B 5/16* (2006.01)

(52) U.S. Cl. ..................... 428/403; 428/404

(58) Field of Classification Search ............. 428/403, 428/404
See application file for complete search history.

(56) References Cited

U.S. PATENT DOCUMENTS

| | | | |
|---|---|---|---|
| 5,262,357 A | 11/1993 | Alivisatos et al. | |
| 5,293,050 A | 3/1994 | Chapple-Sokol et al. | |
| 5,308,804 A | 5/1994 | Lee | |
| 5,354,707 A | 10/1994 | Chapple-Sokol et al. | |
| 5,356,617 A * | 10/1994 | Schlossman | 424/63 |
| 5,395,791 A | 3/1995 | Cheng et al. | |
| 5,422,489 A | 6/1995 | Bhargava | |
| 5,464,696 A * | 11/1995 | Tournier et al. | 428/403 |
| 5,505,928 A | 4/1996 | Alivisatos et al. | |
| 5,525,377 A | 6/1996 | Gallagher et al. | |
| 5,537,000 A | 7/1996 | Alivisatos et al. | |
| 5,585,640 A | 12/1996 | Huston et al. | |
| 5,751,018 A * | 5/1998 | Alivisatos et al. | 257/64 |
| 5,985,173 A | 11/1999 | Gray et al. | |
| 5,990,479 A | 11/1999 | Weiss et al. | |
| 6,103,379 A * | 8/2000 | Margel et al. | 428/403 |
| 6,114,038 A | 9/2000 | Castro et al. | |
| 6,207,229 B1 | 3/2001 | Bawendi et al. | |
| 6,309,701 B1 * | 10/2001 | Barbera-Guillem | 427/213.3 |
| 6,319,426 B1 | 11/2001 | Bawendi et al. | |
| 6,322,901 B1 | 11/2001 | Bawendi et al. | |
| 6,326,144 B1 | 12/2001 | Bawendi et al. | |
| 6,444,143 B2 | 9/2002 | Bawendi et al. | |
| 6,447,698 B1 | 9/2002 | Ihara et al. | |
| 6,501,091 B1 | 12/2002 | Bawendi et al. | |
| 6,548,171 B1 * | 4/2003 | Barbera-Guillem et al. | 428/402.24 |
| 6,617,583 B1 | 9/2003 | Bawendi et al. | |

(Continued)

FOREIGN PATENT DOCUMENTS

WO    WO 99/19515    4/1999

(Continued)

OTHER PUBLICATIONS

Shibata et al, "Preparation of Silica Microspheres Containing Ag Nanoparticles", abstract, Aug. 1998.*

(Continued)

*Primary Examiner*—H. Thi Le
(74) *Attorney, Agent, or Firm*—Steptoe & Johnson LLP

(57) ABSTRACT

A microparticle can include a central region and a peripheral region. The peripheral region can include a nanoparticle, such as a metal nanoparticle, a metal oxide nanoparticle, or a semiconductor nanocrystal. The microparticle can be a member of a monodisperse population of particles.

19 Claims, 7 Drawing Sheets

U.S. PATENT DOCUMENTS

| | | | |
|---|---|---|---|
| 6,660,381 B2* | 12/2003 | Halas et al. | 428/403 |
| 6,721,083 B2* | 4/2004 | Jacobson et al. | 359/296 |
| 6,773,812 B2* | 8/2004 | Chandler et al. | 428/403 |
| 6,783,569 B2* | 8/2004 | Cheon et al. | 75/348 |
| 6,794,265 B2 | 9/2004 | Lee et al. | |
| 6,855,551 B2 | 2/2005 | Bawendi et al. | |
| 2003/0017264 A1 | 1/2003 | Treadway et al. | |

FOREIGN PATENT DOCUMENTS

| | | |
|---|---|---|
| WO | WO 99/26299 | 6/1999 |
| WO | WO 99/50916 | 10/1999 |
| WO | WO 00/17655 | 3/2000 |
| WO | WO 00/17656 | 3/2000 |

OTHER PUBLICATIONS

Ekimov, A.I. et al., "CdS nanocrystal growth in thin silica films: evolution of size distribution function," *Journal of Crystal Growth* 184/185 (1998) 360-364.

Ekimov, A.I. et al., "Growth and optical properties of semiconductor nanocrystals in a glass matrix," *Journal of Luminescence* 70 (1996) 1-20.

Ekimov, A.I. et al., "Growth of CdSe nanocrystals in ion-implanted $SiO_2$ films," *Journal of Crystal Growth* 151 (1995) 38-45.

Ekimov, A.I. et al., "Growth of CdS nanocrystals in silicate glasses and in thin $SiO_2$ films in the Initial states of the phase separation of a solid solution," *Semiconductors*, 28 (5), May 1994, 486-493.

Ekimov, A.I. et al. "Preparation and investigation of $SIO_2$ films activated by CdS semiconductor nanocrystals," *Soviet Physics Semiconductors*, vol. 26, 57-59 (1992).

Ekimov, A.I. et al., "Optical Properties of Semiconductor Quantum Dots in Glass Matrix," *Physica Scripta.* vol. T39, 217-222 (1991).

Colvin et al., "Light-emitting diodes made from cadmium selenide nanocrystals and a semiconducting polymer" *Nature*, 370(6488):354-357, (Aug. 4, 1994).

Correa-Duarte et al., "Stabilization of CdS semiconductor nanoparticles against photodegradation by a silica coating procedure," Chemical Physics Letters, 286, pp. 497-501 (1998).

Dabbousi et al., "Electroluminescence from CdSe quantum-dot/polymer composites," Appl. Phys. Lett., 66 (11), pp. 1316-1318, (1995).

Danek et al., "Synthesis of Luminescent Thin-film CdSeZnSe Quantum Dot Composites Using CdSe Quantum Dots Passivity with an Over layer of ZnS," Chem. Mater., 8(1), pp. 173-180, (1996).

Egner et al., "Tagging in combinatorial chemistry: the use of coloured and fluorescent beads," *Chem. Commun.*, 735-736, Apr. 21, 1997.

Empedocles, et al., "Photoluminescence Spectroscopy of Single CdSe Nanocrystallite Quantum Dots", Physical Review Letters, vol. 77, No. 18, pp. 3873-3876, (1996).

Fischer et al., *J. Phys. Chem.* B 2004, 108, 143.

Fodor, "Techwire," *Science*, 277(5324):393-395, Jul. 18, 1997.

Gan, et al., "Enhanced Photoluminescence and Characterization of Mn-Doped ZnS Nanocrystallites Synthesized in Microemulsion", Langmuir, vol. 13, No. 24, pp. 6427-6431, (1997).

Gao, et al., J. Biomed. Opt. 2002, 7, 532.

Gao et al. *Anal. Chem.* 2004, 76, 2406.

Gao et al. *J. Phys. Chem. B* 2003, 107, 11575.

Giessen et al., Phase Transitions 1999, 68, 59.

Guha et al., "Hybrid organic-inorganic semiconductor-based light emitting diodes" J. Appl. Phys., 82(8), pp. 4126-4128,( Oct. 15, 1997).

Jiang et al., *Adv. Mater.* 2001, 13, 389.

Lee et al., "Surface Derivatization of Nanocrystalline CdSe Semiconductors," Mat. Res. Soc. Symp. Proc. 452, pp. 323-328, (1997).

Lee, J. et al., "Full Color Emission from II-VI Semiconductor Quantum Dot-Polymer Composites," *Adv. Mater.* 12:1102-1105, 2000.

Lin, Y., et al., *Appl. Phys Lett.* 2002, 81, 3134.

Liz-Marzán, et al., "Synthesis of Nanosized Gold-Silica Core-Shell Particles," Langmuir 12, pp. 4329-4335, (1996).

Mikulec, et al, "Fluorescent Semiconductor Nanocrystalites Derivatized With Biomolecules", Aug. 24, 1998, American Chemical Society National Meeting.

Mikulec et al., "Synthesis and Characterization of Highly Luminescent (CdSe)ZnS Quantum Dots," Materials Research Society Symposium, 452, pp. 359-364, (1997).

Peng, et al., "Epitaxial Growth of Highly Luminescent CdSe/CdS Core/Shell Nanocrystals with Photostability and Electronic Accessibility," J. Am. Chem. Soc., 119, pp. 7019-7029, (1997).

van Blaaderen et al. *Langmuir* 1992, 8, 2921.

Wang, D. et al., *Chem. Mater.* 2003, 15, 2724.

Wang et al., "Composite Photonic Crystals from Semiconductor Nanocrystal/Polyelectrolyte-Coated Colloidal Spheres," Chem. Mater., 2003, 15, pp. 2724-2729.

\* cited by examiner

MICROSPHERES INCLUDING NANOPARTICLES

FEDERALLY SPONSORED RESEARCH OR DEVELOPMENT

The U.S. Government may have certain rights in this invention pursuant to Grant No. DMR-98-1328 awarded by the National Science Foundation and Grant No. NSF-CRC CHE-0209898.

TECHNICAL FIELD

This invention relates to microspheres.

BACKGROUND

Microspheres containing chromophores are used in a variety of applications. In many of these applications, the photostability of the chromophores and the monodispersity of the microspheres are important.

SUMMARY

In general, a microsphere includes a central region and a peripheral region that includes a nanoparticle. The nanoparticle can include a metal nanoparticle, a metal oxide nanoparticle, or a semiconductor nanocrystal.

In one aspect, a microsphere includes a central region and a first peripheral region on a surface of the central region, the first peripheral region including a first nanoparticle.

In another aspect, a microsphere includes a central region including a first inorganic material and a peripheral region on a surface of the central region, the peripheral region including a second inorganic material and a semiconductor nanocrystal covalently linked to the second inorganic material.

In another aspect, a population of microspheres includes a member microsphere including a central region including a first inorganic material, and a first peripheral region on a surface of the central region, the first peripheral region including a second inorganic material and a first nanoparticle.

The central region can include an inorganic material. The central region can include silicon. The first peripheral region can include an inorganic material. The first peripheral region can include silicon or titanium. The microsphere can have a diameter of less than 500 micrometers, less than 10 micrometers, or less than 1 micrometer. The central region can be substantially free of nanoparticles. The first nanoparticle can be a metal nanoparticle, a metal oxide nanoparticle, or a semiconductor nanocrystal, such as a gold nanoparticle, a cobalt nanocrystal, an iron oxide nanocrystal, or a Group II-VI nanocrystal.

The semiconductor nanocrystal can include a core including a first semiconductor material. The semiconductor nanocrystal can further include a shell overcoating the core, the shell including a second semiconductor material. The first semiconductor material can be a Group II-VI compound, a Group II-V compound, a Group III-VI compound, a Group III-V compound, a Group IV-VI compound, a Group I-III-VI compound, a Group II-IV-VI compound, or a Group II-IV-V compound. The first semiconductor material can be ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or mixtures thereof. The second semiconductor material can be ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof.

The microsphere can include a plurality of semiconductor nanocrystals having a rms deviation in diameter of no greater than 5%. The microsphere can include a ligand having affinity for a surface of a semiconductor nanocrystal. The ligand can be covalently linked to the first peripheral region. The central region can be substantially spherical in shape. The microsphere can be a member of a population of microsphere having a rms deviation in diameter of no greater than 10%.

The microsphere can include a second peripheral region on a surface of the first peripheral region. The second peripheral region can include an inorganic material. The second peripheral region can include silicon or titanium. The second peripheral region can include a second nanoparticle. The second nanoparticle can be a metal nanoparticle, a metal oxide nanoparticle, or a semiconductor nanocrystal. In certain embodiments, when the first nanoparticle is a fluorescent nanoparticle, the second nanoparticle can be a fluorescent nanoparticle. The first nanoparticle can have an emission distinguishable from an emission of the second nanoparticle.

In another aspect, a family of microsphere populations includes a first population of microspheres, where each microsphere in the first population includes a central region, and a peripheral region on a surface of the central region, the peripheral region including a first nanoparticle; and a second population of microspheres, where each microsphere in the second population includes a central region; and a peripheral region on a surface of the central region, the peripheral region including a second nanoparticle.

In the family, the first nanoparticle and the second nanoparticle can each independently be a fluorescent nanoparticle. When the first and the second nanoparticles are both fluorescent nanoparticles, the first population can have a fluorescence emission distinguishable from a fluorescence emission of the second population.

The microspheres of the first population can have a rms deviation in diameter of no greater than 10%. The microspheres of the second population can have a rms deviation in diameter of no greater than 10%. The microspheres of the first population can have an average diameter distinct from an average diameter of the microspheres of the second population. The microspheres of the first population and the microspheres of the second population can have distinct fluorescence emission wavelengths.

The microspheres of the first population can have an average diameter of less than 500 micrometers, less than 10 micrometers, or less than 1 micrometer. The microspheres of the second population can have an average diameter of less than 1 micrometer.

In another aspect, a method of making a microsphere includes providing a particle including a first inorganic material, contacting the particle with a precursor to a second inorganic material and a first nanoparticle, and forming a peripheral region on a surface of the particle, the peripheral region including the second inorganic material and the first nanoparticle.

The first inorganic material can include silicon. The second inorganic material can include silicon or titanium.

The first nanoparticle can be a metal nanoparticle, a metal oxide nanocrystal, or a semiconductor nanocrystal. The semiconductor nanocrystal can include a ligand having affinity for a surface of a semiconductor nanocrystal. The ligand can be capable of reacting with the precursor to the second inorganic material.

The particle including the first inorganic material can be a member of a population of particles having a rms deviation in diameter of no greater than 10%. The particle including the first inorganic material can be substantially spherical in shape. The particle including the first inorganic material can have a diameter of less than 500 micrometers, less than 10 micrometers, or less than 1 micrometer. The method can include forming the particle including the first inorganic material.

In another aspect, a method of making a family of microsphere populations includes selecting a first nanoparticle and a second nanoparticle, and forming a first population of microspheres. The first population includes a first member microsphere including a central region including a first inorganic material, and a peripheral region on a surface of the central region, the peripheral region including a second inorganic material and the first nanoparticle. The method includes forming a second population of microspheres. The second population includes a second member microsphere including a central region including a third inorganic material, and a peripheral region on a surface of the central region, the peripheral region including a fourth inorganic material and the second nanoparticle.

In the method, the first nanoparticle and the second nanoparticle can each independently be a fluorescent nanoparticle. The first member microsphere can have a fluorescence emission distinguishable from a fluorescence emission of the second member microsphere.

The first member microsphere can have a fluorescence wavelength distinguishable from a fluorescence wavelength of the second member microsphere. The first member microsphere can have a fluorescence intensity distinguishable from a fluorescence intensity of the second member microsphere.

In another aspect, a method of tracking microspheres includes viewing a first microsphere including a central region and a peripheral region on a surface of the central region, the peripheral region including a first nanoparticle, and viewing a second microsphere including a central region and a peripheral region on a surface of the central region, the peripheral region including a second nanoparticle.

In the method, the first nanoparticle and the second nanoparticle can each independently be a fluorescent nanoparticle. The first microsphere can have a fluorescence emission distinguishable from a fluorescence emission of the second microsphere. The first microsphere can have a size distinguishable from a size of the second microsphere. Viewing the first microsphere can include observing a fluorescence emission from the first microsphere. The first microsphere can include a central region including an inorganic material. The first microsphere can include a peripheral region including an inorganic material. The first microsphere can include a semiconductor nanocrystal.

The microspheres can be fluorescent particles with narrow size distributions and favorable fluorescence properties. Because the microsphere cores and the semiconductor nanocrystals are synthesized separately, both can exhibit size monodispersity. Microspheres including semiconductor nanocrystals can have narrow emission linewidths. The fluorescence properties of the microspheres can be more robust (e.g., have greater chemical and photostability) than microspheres incorporating organic fluorescent dyes. Micrometer and sub-micrometer sized fluorescent microspheres can be used in photonics and biological imaging.

The details of one or more embodiments are set forth in the accompanying drawings and the description below. Other features, objects, and advantages will be apparent from the description and drawings, and from the claims.

DETAILED DESCRIPTION

Figure 1A:
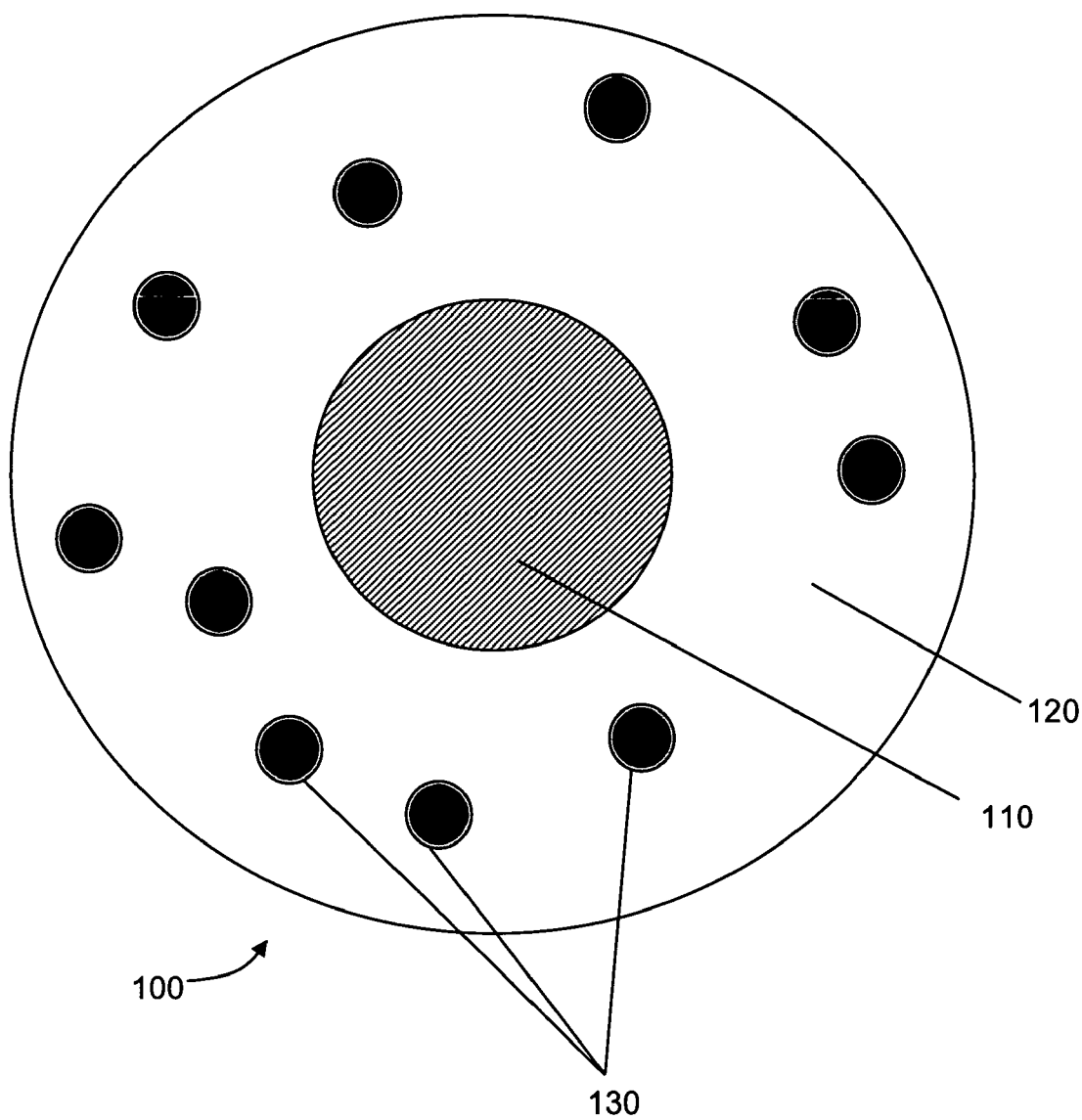
FIG. 1a is a schematic depiction of a cross-section of a microsphere incorporating nanoparticles.

Microspheres containing chromophores have been utilized in an extensive variety of applications, including photonic crystals, biological labeling, and flow visualization in microfluidic channels. See, for example, Y. Lin, et al., Appl. Phys. Lett. 2002, 81, 3134; D. Wang, et al., Chem. Mater. 2003, 15, 2724; X. Gao, et al., J. Biomed. Opt. 2002, 7, 532; M. Han, et al., Nature Biotechnology. 2001, 19, 631; V. M. Pai, et al., Mag. & Magnetic Mater. 1999, 194, 262, each of which is incorporated by reference in its entirety. Both the photostability of the chromophores and the monodispersity of the microspheres can be important. Nanoparticles, such as, for example, metal nanoparticles, metal oxide nanoparticles, or semiconductor nanocrystals can be incorporated into microspheres. The optical, magnetic, and electronic properties of the nanoparticles can allow them to be observed while associated with the microspheres and can allow the microspheres to be identified and spatially monitored. For example, the high photostability, good fluorescence efficiency and wide emission tunability of colloidally synthesized semiconductor nanocrystals can make them an excellent choice of chromophore. Unlike organic dyes, nanocrystals that emit different colors (i.e. different wavelengths) can be excited simultaneously with a single light source. Colloidally synthesized semiconductor nanocrystals (such as, for example, core-shell CdSe/ZnS and CdS/ZnS nanocrystals) can be incorporated into microspheres. The microspheres can be monodisperse silica microspheres.

The nanoparticle can be a metal nanoparticle, a metal oxide nanoparticle, or a semiconductor nanocrystal.

The metal nanoparticle or metal oxide nanoparticle can have a dimension of less than 100 nanometers. The metal of the metal nanoparticle or the metal oxide nanoparticle can include titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, scandium, yttrium, lanthanum, a lanthanide series or actinide series element (e.g., cerium, praseodymium, neodymium, promethium, samarium, europium, gadolinium, terbium, dysprosium, holmium, erbium, thulium, ytterbium, lutetium, thorium, protactinium, and uranium), boron, aluminum, gallium, indium, thallium, silicon, germanium, tin, lead, antimony, bismuth, polonium, magnesium, calcium, strontium, and barium. In certain embodiments, the metal can be iron, ruthenium, cobalt, rhodium, nickel, palladium, platinum, silver, gold, cerium or samarium. The metal oxide can be an oxide of any of these materials or combination of materials. For example, the metal can be gold, or the metal oxide can be an iron oxide (e.g., $Fe_2O_3$, $Fe_3O_4$), a cobalt oxide (e.g., CoO), a zinc oxide (e.g., ZnO), a cerium oxide (e.g., $CeO_2$), or a titanium oxide (e.g., $TiO_2$). Preparation of metal and metal oxide nanoparticles is described, for example, in U.S. Pat. Nos. 5,897,945 and 6,759,199, each of which is incorporated by reference in its entirety.

Semiconductor nanocrystals with narrow size distributions and high luminescent efficiencies are an attractive alternative to organic molecules in applications such as optoelectronic devices and biological fluorescence labeling. See, for example, V. L. Colvin, et al., *Nature* 1994, 370, 354; B. O. Dabbousi, et al., *Appl. Phys. Lett.* 1995, 66, 1316; M. Bruchez Jr., et al., *Science* 1998, 281, 2013; W. C. W. Chan, and S. Nie, *Science* 1998, 281, 2016; and H. Mattoussi, et al., *J. Am. Chem. Soc.* 2000, 122, 12142, each of which is incorporated by reference in its entirety. Semiconductor nanocrystals can be more stable to photobleaching and have a more saturated fluorescence (i.e., narrower emission bandwidths) compared to organic molecules. Their optical properties are size-tunable and independent of their chemical properties.

The method of manufacturing a nanocrystal is a colloidal growth process. See, for example, U.S. Pat. Nos. 6,322,901 and 6,576,291, each of which is incorporated by reference in its entirety. Colloidal growth occurs by rapidly injecting an M-containing compound and an X donor into a hot coordinating solvent. The coordinating solvent can include an amine. The M-containing compound can be a metal, an M-containing salt, or an M-containing organometallic compound. The injection produces a nucleus that can be grown in a controlled manner to form a nanocrystal. The reaction mixture can be gently heated to grow and anneal the nanocrystal. Both the average size and the size distribution of the nanocrystals in a sample are dependent on the growth temperature. The growth temperature necessary to maintain steady growth increases with increasing average crystal size. The nanocrystal is a member of a population of nanocrystals. As a result of the discrete nucleation and controlled growth, the population of nanocrystals obtained has a narrow, monodisperse distribution of diameters. The monodisperse distribution of diameters can also be referred to as a size. The process of controlled growth and annealing of the nanocrystals in the coordinating solvent that follows nucleation can also result in uniform surface derivatization and regular core structures. As the size distribution sharpens, the temperature can be raised to maintain steady growth. By adding more M-containing compound or X donor, the growth period can be shortened.

The M-containing salt can be a non-organometallic compound, e.g., a compound free of metal-carbon bonds. M is cadmium, zinc, magnesium, mercury, aluminum, gallium, indium, thallium, or lead. The M-containing salt can be a metal halide, metal carboxylate, metal carbonate, metal hydroxide, metal oxide, or metal diketonate, such as a metal acetylacetonate. The M-containing salt is less expensive and safer to use than organometallic compounds, such as metal alkyls. For example, the M-containing salts are stable in air, whereas metal alkyls are generally unstable in air. M-containing salts such as 2,4-pentanedionate (i.e., acetylacetonate (acac)), halide, carboxylate, hydroxide, oxide, or carbonate salts are stable in air and allow nanocrystals to be manufactured under less rigorous conditions than corresponding metal alkyls.

Suitable M-containing salts include cadmium acetylacetonate, cadmium iodide, cadmium bromide, cadmium chloride, cadmium hydroxide, cadmium carbonate, cadmium acetate, cadmium oxide, zinc acetylacetonate, zinc iodide, zinc bromide, zinc chloride, zinc hydroxide, zinc carbonate, zinc acetate, zinc oxide, magnesium acetylacetonate, magnesium iodide, magnesium bromide, magnesium chloride, magnesium hydroxide, magnesium carbonate, magnesium acetate, magnesium oxide, mercury acetylacetonate, mercury iodide, mercury bromide, mercury chloride, mercury hydroxide, mercury carbonate, mercury acetate, aluminum acetylacetonate, aluminum iodide, aluminum bromide, aluminum chloride, aluminum hydroxide, aluminum carbonate, aluminum acetate, gallium acetylacetonate, gallium iodide, gallium bromide, gallium chloride, gallium hydroxide, gallium carbonate, gallium acetate, indium acetylacetonate, indium iodide, indium bromide, indium chloride, indium hydroxide, indium carbonate, indium acetate, thallium acetylacetonate, thallium iodide, thallium bromide, thallium chloride, thallium hydroxide, thallium carbonate, or thallium acetate.

Alkyl is a branched or unbranched saturated hydrocarbon group of 1 to 100 carbon atoms, preferably 1 to 30 carbon atoms, such as methyl, ethyl, n-propyl, isopropyl, n-butyl, isobutyl, t-butyl, octyl, decyl, tetradecyl, hexadecyl, eicosyl, tetracosyl and the like, as well as cycloalkyl groups such as cyclopentyl, cyclohexyl and the like. Optionally, an alkyl can contain 1 to 6 linkages selected from the group consisting of —O—, —S—, -M- and —NR— where R is hydrogen, or $C_1$–$C_8$ alkyl or lower alkenyl.

Prior to combining the M-containing salt with the X donor, the M-containing salt can be contacted with a coordinating solvent to form an M-containing precursor. Typical coordinating solvents include alkyl phosphines, alkyl phosphine oxides, alkyl phosphonic acids, or alkyl phosphinic acids; however, other coordinating solvents, such as pyridines, furans, and amines may also be suitable for the nanocrystal production. Examples of suitable coordinating solvents include pyridine, tri-n-octyl phosphine (TOP) and tri-n-octyl phosphine oxide (TOPO). Technical grade TOPO can be used. The coordinating solvent can include a 1,2-diol or an aldehyde. The 1,2-diol or aldehyde can facilitate reaction between the M-containing salt and the X donor and improve the growth process and the quality of the nanocrystal obtained in the process. The 1,2-diol or aldehyde can be a $C_6$–$C_{20}$ 1,2-diol or a $C_6$–$C_{20}$ aldehyde. A suitable 1,2-diol is 1,2-hexadecanediol and a suitable aldehyde is dodecanal.

The X donor is a compound capable of reacting with the M-containing salt to form a material with the general formula MX. Typically, the X donor is a chalcogenide donor or a pnictide donor, such as a phosphine chalcogenide, a bis(silyl) chalcogenide, dioxygen, an ammonium salt, or a tris(silyl) pnictide. Suitable X donors include dioxygen, elemental sulfur, bis(trimethylsilyl) selenide ($(TMS)_2Se$), trialkyl phosphine selenides such as (tri-n-octylphosphine) selenide (TOPSe) or (tri-n-butylphosphine) selenide (TBPSe), trialkyl phosphine tellurides such as (tri-n-octylphosphine) telluride (TOPTe) or hexapropylphosphorustriamide telluride (HPPTTe), bis(trimethylsilyl)telluride ((TMS)$_2$Te), sulfur, bis(trimethylsilyl)sulfide ((TMS)$_2$S), a trialkyl phosphine sulfide such as (tri-n-octylphosphine) sulfide (TOPS), tris(dimethylamino) arsine, an ammonium salt such as an ammonium halide (e.g., NH$_4$Cl), tris(trimethylsilyl) phosphide ((TMS)$_3$P), tris(trimethylsilyl) arsenide ((TMS)$_3$As), or tris(trimethylsilyl) antimonide ((TMS)$_3$Sb). In certain embodiments, the M donor and the X donor can be moieties within the same molecule.

The nanocrystal manufactured from an M-containing salt grows in a controlled manner when the coordinating solvent includes an amine. The amine in the coordinating solvent can contribute to the quality of the nanocrystal obtained from the M-containing salt and X donor. Preferably, the coordinating solvent is a mixture of the amine and an alkyl phosphine oxide in a mole ratio of 10:90, more preferably 30:70 and most preferably 50:50. The combined solvent can decrease size dispersion and can improve photoluminescence quantum yield of the nanocrystal. The preferred amine is a primary alkyl amine or a primary alkenyl amine, such as a $C_2$–$C_{20}$ alkyl amine, a $C_2$–$C_{20}$ alkenyl amine, preferably a $C_8$–$C_{18}$ alkyl amine or a $C_8$–$C_{18}$ alkenyl amine. For example, suitable amines for combining with tri-octylphosphine oxide (TOPO) include 1-hexadecylamine, or oleylamine. When the 1,2-diol or aldehyde and the amine are used in combination with the M-containing salt to form a population of nanocrystals, the photoluminescence quantum efficiency and the distribution of nanocrystal sizes are improved in comparison to nanocrystals manufactured without the 1,2-diol or aldehyde or the amine.

The nanocrystal can be a member of a population of nanocrystals having a narrow size distribution. The nanocrystal can be a sphere, rod, disk, or other shape. The nanocrystal can include a core of a semiconductor material. The nanocrystal can include a core having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof.

The emission from the nanocrystal can be a narrow Gaussian emission band that can be tuned through the complete wavelength range of the ultraviolet, visible, or infrared regions of the spectrum by varying the size of the nanocrystal, the composition of the nanocrystal, or both. For example, both CdSe and CdS can be tuned in the visible region and InAs can be tuned in the infrared region.

A population of nanocrystals can have a narrow size distribution. The population can be monodisperse and can exhibit less than a 15% rms deviation in diameter of the nanocrystals, preferably less than 10%, more preferably less than 5%. Spectral emissions in a narrow range of between 10 and 100 nm full width at half max (FWHM) can be observed. Semiconductor nanocrystals can have emission quantum efficiencies of greater than 2%, 5%, 10%, 20%, 40%, 60%, 70%, or 80%.

The semiconductor forming the core of the nanocrystal can include Group II-VI compounds, Group II-V compounds, Group III-VI compounds, Group III-V compounds, Group IV-VI compounds, Group I-III-VI compounds, Group II-IV-VI compounds, and Group II-IV-V compounds, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or mixtures thereof.

The quantum efficiency of emission from nanocrystals having a core of a first semiconductor material can be enhanced by applying an overcoating of a second semiconductor material such that the conduction band of the second semiconductor material is of higher energy than that of the first semiconductor material, and the valence band of the second semiconductor material is of lower energy than that of the first semiconductor material. As a result, charge carriers, i.e., electrons and holes, are confined in the core of the nanocrystal when in an excited state. Alternatively, the conduction band or valence band of overcoating material can have an energy intermediate between the energies of the conduction and valence bands of the core material. In this case, one carrier can be confined to the core while the other is confined to the overcoating material when in an excited state. See, for example, U.S. patent application Ser. No. 10/638,546, which is incorporated by reference in its entirety. The core can have an overcoating on a surface of the core. The overcoating can be a semiconductor material having a composition different from the composition of the core, and can have a band gap greater than the band gap of the core. The overcoat of a semiconductor material on a surface of the nanocrystal can include a Group II-VI compounds, Group II-V compounds, Group III-VI compounds, Group III-V compounds, Group IV-VI compounds, Group I-III-VI compounds, Group II-IV-VI compounds, and Group II-IV-V compounds, for example, ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or mixtures thereof.

The outer surface of the nanocrystal can include a layer of compounds derived from the coordinating agent used during the growth process. The surface can be modified by repeated exposure to an excess of a competing coordinating group to form an overlayer. For example, a dispersion of the capped nanocrystal can be treated with a coordinating organic compound, such as pyridine, to produce crystals which disperse readily in pyridine, methanol, and aromatics but no longer disperse in aliphatic solvents. Such a surface exchange process can be carried out with any compound capable of coordinating to or bonding with the outer surface of the nanocrystal, including, for example, phosphines, thiols, amines and phosphates. The nanocrystal can be exposed to short chain polymers which exhibit an affinity for the surface and which terminate in a moiety having an affinity for a suspension or dispersion medium. Such affinity improves the stability of the suspension and discourages flocculation of the nanocrystal.

Monodentate alkyl phosphines (and phosphine oxides; the term phosphine below will refer to both) can passivate nanocrystals efficiently. When nanocrystals with conventional monodentate ligands are diluted or embedded in a non-passivating environment (i.e., one where no excess ligands are present), they tend to lose their high luminescence. Typical are an abrupt decay of luminescence, aggregation, and/or phase separation. In order to overcome these limitations, polydentate ligands can be used, such as a family of polydentate oligomerized phosphine ligands. The polydentate ligands show a high affinity between ligand and nanocrystal surface. In other words, they are stronger ligands, as is expected from the chelate effect of their polydentate characteristics.

Oligomeric phosphines have more than one binding site to the nanocrystal surface, which ensures their high affinity to the nanocrystal surface. See, for example, for example, U.S. Ser. No. 10/641,292, filed Aug. 15, 2003, and U.S. Ser. No. 60/403,367, filed Aug. 15, 2002, each of which is incorporated by reference in its entirety. The oligomeric phosphine can be formed from a monomeric, polyfunctional phosphine, such as, for example, tris(hydroxypropyl)phosphine, and a polyfunctional oligomerization reagent, such as, for example, a diisocyanate. The oligomeric phosphine can be contacted with an isocyanate of formula R'-L-NCO, wherein L is $C_2$–$C_{24}$ alkylene, and R' has the formula

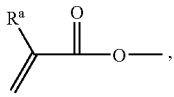

R' has the formula

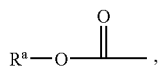

or R' is hydrogen, wherein $R^a$ is hydrogen or $C_1$–$C_4$ alkyl.

An overcoating process is described, for example, in U.S. Pat. No. 6,322,901, incorporated herein by reference in its entirety. By adjusting the temperature of the reaction mixture during overcoating and monitoring the absorption spectrum of the core, overcoated materials having high emission quantum efficiencies and narrow size distributions can be obtained. Alternatively, an overcoating can be formed by exposing a core nanocrystal having a first composition and first average diameter to a population of nanocrystals having a second composition and a second average diameter smaller than the first average diameter.

Size distribution during the growth stage of the reaction can be estimated by monitoring the absorption line widths of the particles. Modification of the reaction temperature in response to changes in the absorption spectrum of the particles allows the maintenance of a narrow particle size distribution during growth. Reactants can be added to the nucleation solution during crystal growth to grow larger crystals. By stopping growth at a particular nanocrystal average diameter, a population having an average nanocrystal diameter of less than 150 Å can be obtained. A population of nanocrystals can have an average diameter of 15 Å to 125 Å. The emission spectra of the nanocrystals can be tuned continuously over the wavelength range of 300 nm to 5 microns, or for example, when CdSe or CdTe is the core material, from 400 nm to 800 nm. IR-emitting semiconductor nanocrystals can be prepared according to methods described in, for example, U.S. patent application Ser. No. 10/638,546, which is incorporated by reference in its entirety.

The particle size distribution can be further refined by size selective precipitation with a poor solvent for the nanocrystals, such as methanol/butanol as described in U.S. Pat. No. 6,322,901, incorporated herein by reference in its entirety. For example, nanocrystals can be dispersed in a solution of 10% butanol in hexane. Methanol can be added dropwise to this stirring solution until opalescence persists. Separation of supernatant and flocculate by centrifugation produces a precipitate enriched with the largest crystals in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected nanocrystal population can have no more than a 15% rms deviation from mean diameter, preferably 10% rms deviation or less, and more preferably 5% rms deviation or less.

Transmission electron microscopy (TEM) can provide information about the size, shape, and distribution of the nanocrystal population. Powder X-ray diffraction (XRD) patterns can provide the most complete information regarding the type and quality of the crystal structure of the nanocrystals. Estimates of size are also possible since particle diameter is inversely related, via the X-ray coherence length, to the peak width. For example, the diameter of the nanocrystal can be measured directly by transmission electron microscopy or estimated from X-ray diffraction data using, for example, the Scherrer equation. It also can be estimated from the UV/Vis absorption spectrum, if calibrated by a direct measurement of diameter, such as XRD or TEM.

Fluorescent semiconductor nanocrystals have been introduced into microspheres by either synthesizing the nanocrystals in situ using the microsphere as a host matrix, or using mercaptosiloxane functionalized nanocrystals as "seeds" for growing microspheres. See, for example, Y. Lin, et al. *Appl. Phys Lett.* 2002, 81, 3134; N. A. Dhas, et al. *Chem. Mater.* 1999, 11, 806; M. A. Correa-Duarte, et al., Chem. Phys. Lett. 1998, 286, 497; A. L. Rogach, et al., *Chem. Mater.* 2000, 12, 2676; and J. N. Cha, et al., *Nano Lett.* 2003, 3, 907, each of which is incorporated by reference in its entirety. These methods, however, produced either relatively low quality nanocrystals or microspheres of significant polydispersity. Significantly broadened and deep trap emission can also result from the silication process. Relatively monodisperse mesoporous polystyrene and silica microspheres were impregnated with high quality CdSe/ZnS core-shell nanocrystals (see, for example, X. Gao, S. Nie, *Anal. Chem.* 2004, 76, 2406; and X. Gao, S. Nie, *J. Phys. Chem. B* 2003, 107, 11575, each of which is incorporated by reference in its entirety). In the case of polystyrene, this was achieved through hydrophobic interactions between polystyrene and the hydrophobic ligands on the nanocrystal surface. For silica the method was similar, except the surface pores of the silica microspheres were first coated with small hydrophobic molecules. Because the nanocrystals were not chemically bound to the internal surface of the sphere, exposure to non-polar solvents caused the nanocrystals to leach out. This would be unsuitable in a flow visualization experiment, for example, where the velocity profiles of fluorescent microspheres in a non-polar solvent are to be determined. The pore sizes of the mesoporous microspheres were on the order of tens of nanometers. This set a lower limit of approximately 1 micrometer to possible microsphere sizes.

Semiconductor nanocrystals can be incorporated into a silica or titania shell, or coat, grown on preformed sub-micrometer diameter silica microspheres. The coated microspheres can be dispersed in a variety of polar and non-polar solvents. The microspheres can be robust. For example, repeated sonication and washes in solvents does not result in any evident loss of nanocrystals.

Referring to FIG. 1a, microsphere 100 includes central particle 110 and peripheral layer 120. Central particle 110 can be a silica microsphere. Peripheral layer 120 can include an inorganic material, such as silica or titania. Dispersed in peripheral layer 120 are nanoparticles 130. Nanoparticles 130 can include a metal nanoparticle, for example, a gold nanoparticle, a magnetic nanoparticle, for example, a cobalt or iron oxide nanocrystal, or a semiconductor nanocrystal.

Figure 1B:
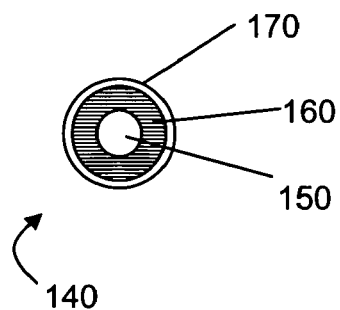
FIG. 1b is a schematic depiction of a cross-section of a semiconductor nanocrystal.

The nanoparticles 130 dispersed in peripheral layer 120 can be alike or different. For example, microsphere 100 can include a mixture of magnetic cobalt nanoparticles and semiconductor nanocrystals. In another example, microsphere 100 can include semiconductor nanocrystals of different sizes or compositions. FIG. 1b shows a cross section of a semiconductor nanocrystal 140, including a core 150, optionally shell 160, and outer layer 170. Core 150 includes a first semiconductor material. Shell 160 can include a second semiconductor material. Outer layer 170 can include a ligand that has an affinity for a surface of semiconductor nanocrystal 140.

A nanoparticle 130 can include a ligand that provides solubility in a desired medium, such as a non-polar solvent, or a polar solvent, such as ethanol or water. The ligand can have one end that has affinity for the surface of nanoparticle 130, and another that is capable of reacting with a precursor to a peripheral layer. The precursor can be a polymer precursor. The precursor can be, for example, a silica precursor, such as tetraethoxysilane, or a titania precursor, such as tetrabutylorthotitanate. The end of the ligand that reacts with the precursor can become incorporated in the peripheral layer. In this way the nanoparticle can become anchored to the peripheral layer. The ligand can become covalently bound to the peripheral layer material.

Central particle 110 can have a diameter of less than 1 millimeter, such as, for example, less than 500 micrometers, less than 100 micrometers, less than 10 micrometers, or less than 1 micrometer. For example, central particle 110 can have a diameter between 100 nm and 1000 nm. Central particle 110 can be a member of a monodisperse population of particles. For example, central particle 110 can be a member of a monodisperse population of microspheres. When central particle 110 is a member of a monodisperse population of microspheres, peripheral layers 120 can be formed individually on central particles 110 without substantially altering the monodispersity of the microsphere population. In other words, a population of microspheres 100 formed from a monodisperse population of particles 110 can be a monodisperse population of microspheres.

Figure 1C:
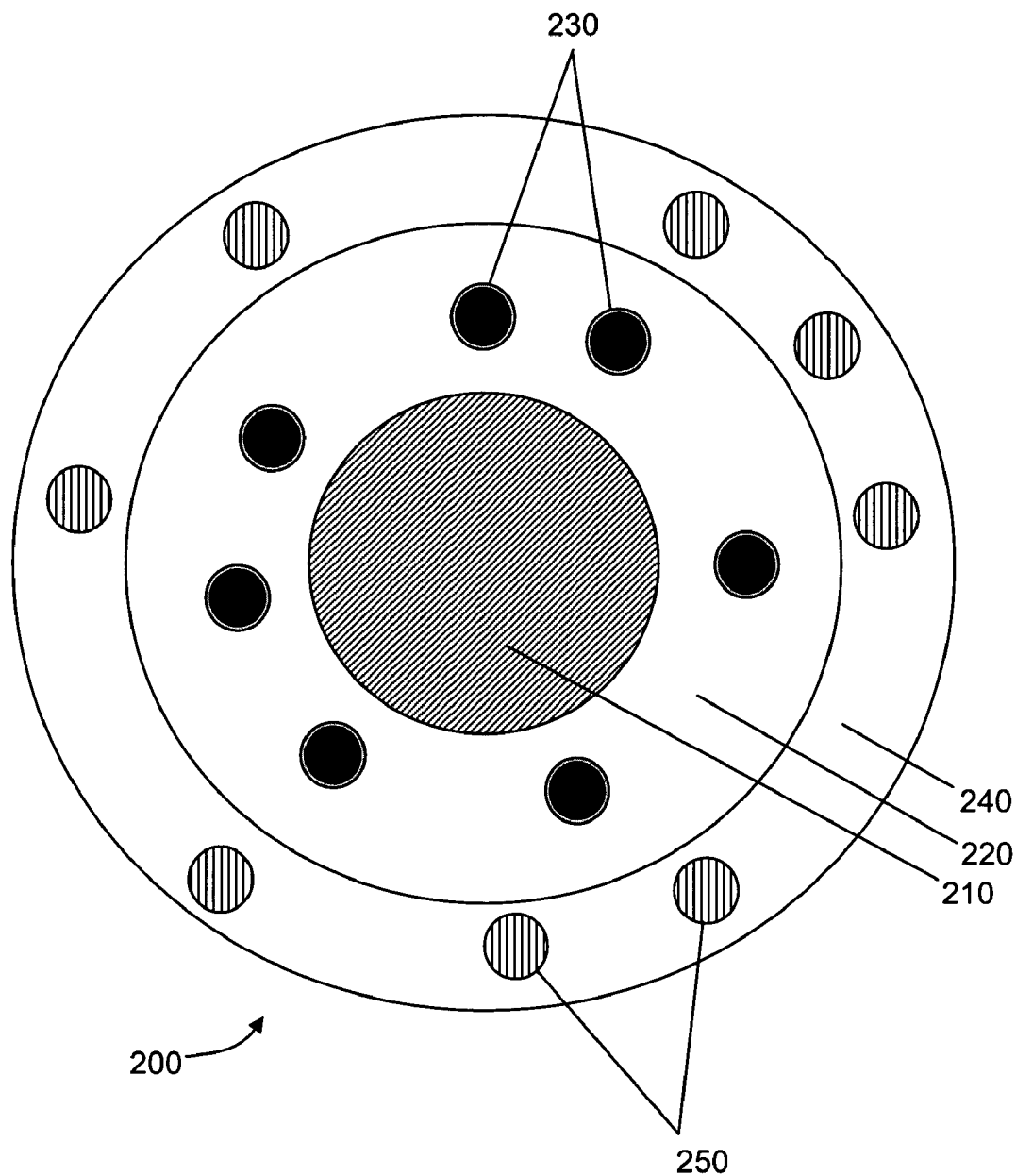
FIG. 1c is a schematic depiction of a cross-section of a microsphere incorporating nanoparticles.

As shown in FIG. 1c, microsphere 200 includes central particle 210 and a first peripheral layer 220. Dispersed in peripheral layer 220 are nanoparticles 230. Microsphere 200 also includes a second peripheral layer 240. Dispersed in peripheral layer 240 are nanoparticles 250. Microsphere 200 can be made by forming a second peripheral layer on a microsphere 100. The nanoparticles 230 in the first peripheral layer 220 can have the same composition or a different composition as the nanoparticles 250 in the second peripheral layer 240. The nanoparticles in the first peripheral layer 220 can have the same size or a different size as the nanoparticles in the second peripheral layer 240. For example, nanoparticles 230 can be gold nanoparticles and nanoparticles 250 can be magnetic cobalt nanoparticles. In another example, nanoparticles 230 can be CdSe/ZnS semiconductor nanocrystals and nanoparticles 250 can be CdS/ZnS semiconductor nanocrystals. In another example, nanoparticles 230 are CdSe/ZnS semiconductor nanocrystals having a different average diameter from nanoparticles 250, which are also CdSe/ZnS semiconductor nanocrystals. Additional peripheral layers can be added. The additional peripheral layers can similarly include nanoparticles.

In general, a single microsphere can include nanoparticles of a single size and composition. Alternatively, the microsphere can include nanoparticles of more than one size, and having the same composition; or the nanoparticles can have different sizes and compositions. Thus, a microsphere can be prepared that fluoresces at a single wavelength or at multiple wavelengths; is both fluorescent and magnetic; or has other combinations of properties derived from the nanoparticles.

Microspheres incorporating fluorescent materials can be distinguished by the color (i.e. wavelength) of fluorescence emission, the intensity of the emission, or both. For example, two microspheres can incorporate materials that fluoresce at different wavelengths (i.e. the emission wavelengths can be distinguished); or can incorporate materials that fluoresce at the same wavelength but with distinguishable intensities. The fluorescence properties can be correlated with a size of microsphere, such that a population of microspheres having a narrow size distribution shares fluorescence wavelength (or wavelengths) and intensity (or intensities). When a size measurement is inconvenient or impractical, the fluorescence properties can be used to distinguish, identify or track microspheres of a particular size. See, for example, U.S. Pat. No. 6,617,583, which is incorporated by reference in its entirety.

Microspheres can be formed from a metal, ceramic, or polymer. The microsphere can include an inorganic material or an inorganic material. Some examples of microsphere materials are silica, titania, poly(divinylbenzene), poly(styrene), and poly(methylmethacrylate). A coating can be grown on a surface of a microsphere. For example, the coating can include silica or titania. A nanoparticle, such as a semiconductor nanocrystal, can be incorporated in the coating.

A shell of silica can be grown on a silica microsphere in the presence of properly derivatized nanoparticles, such as semiconductor nanocrystals. See, for example, A. van Blaaderen, and A. Vrij, *Langmuir* 1992, 8, 2921, which is incorporated by reference in its entirety. The core silica microspheres can be synthesized using previously established techniques (see, for example, G. H. Bogush, et al., *J. Non-Cryst. Solids* 1988, 104, 95; and W. Stöber, et al., *J. Colloid Interface Sci.,* 1968, 26, 62, each of which is incorporated by reference in its entirety). To incorporate the nanocrystals into the microsphere shell, the ligands on the nanocrystal can impart both ethanol solubility and chemical compatibility with the silica matrix. The ligands on the nanocrystal surface (for example, TOPO ligands) can be exchanged for a ligand which promotes ethanol solubility and a ligand which can react with silica precursors. For example, the ligand can be an alkoxy silane having moiety including a hydroxy, sulfhydryl, carboxy, disulfide, phosphine, phosphite, or amino group.

For example, TOPO can be exchanged for a mixture of 5-amino-1-pentanol (AP), which can promote ethanol solubility, and 3-aminopropyltrimethoxysilane (APS), which can react with a silica precursor. Other ligands that promote ethanol solubility or silica precursor reactivity can be used. The amino groups of AP and APS can bind to the nanocrystal surface. The hydroxyl group of AP can permit dispersion in ethanol while the alkoxysilane moiety of APS can allow the formation of siloxane bonds with the silica host matrix. The properly cap-exchanged nanocrystals can be dispersed in a mixture of ethanol, a silica precursor (such as tetraethoxysilane) and silica microspheres. Addition of water and ammonium hydroxide to this mixture at elevated temperatures causes rapid hydrolysis of the siloxane precursor, which subsequently condenses to form a thin shell of silica around the microsphere. See FIG. 2a.

Figure 2:
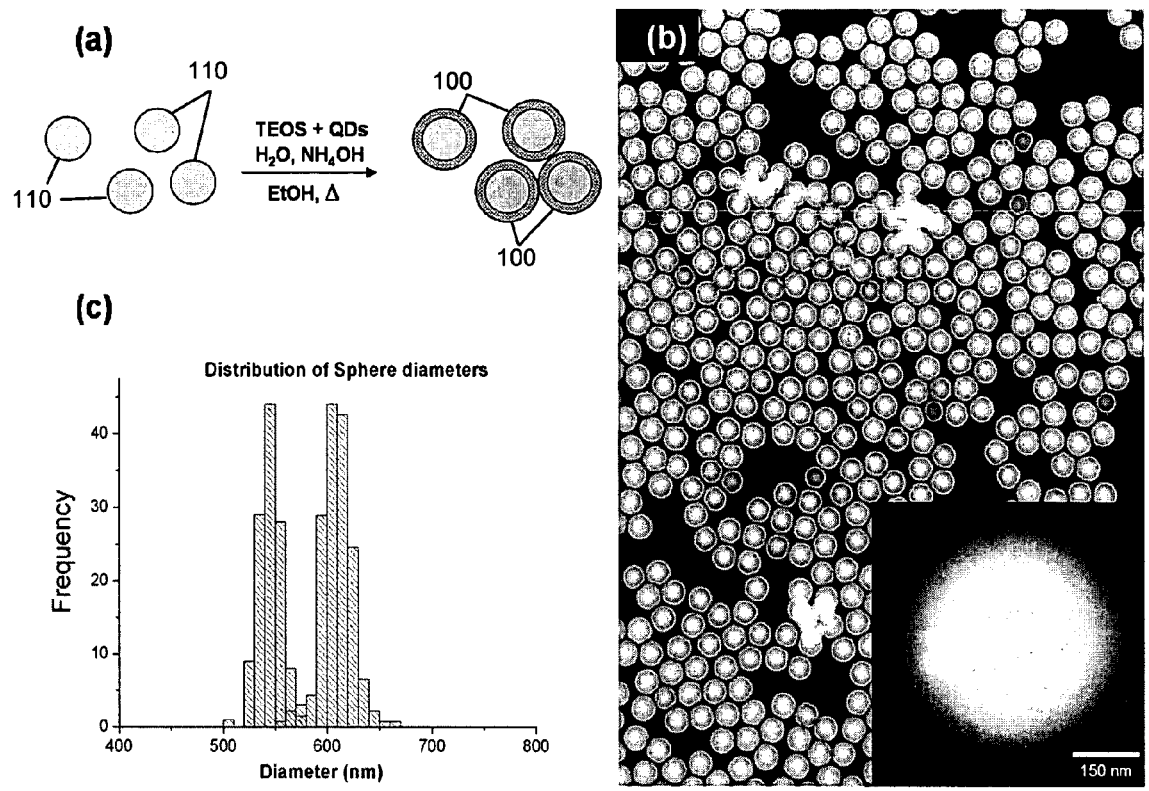
FIG. 2a is a schematic of the growth of a shell on a microsphere.
FIG. 2b is a transmission electron microscope (TEM) image of microspheres.
FIG. 2c is a histogram depicting the size distribution of microspheres.
Figure 3:
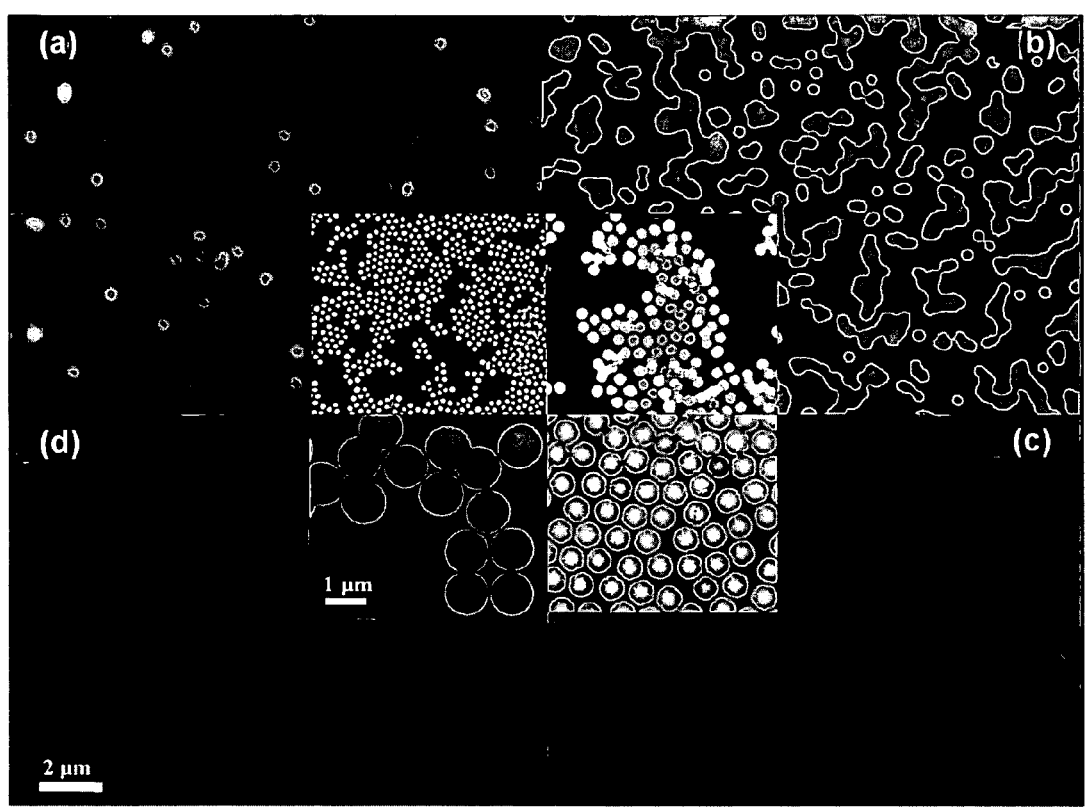
FIGS. 3a–3d are fluorescence micrographs of microspheres. The insets of FIGS. 3a–3d are TEM images of the corresponding microspheres.
Figure 4:
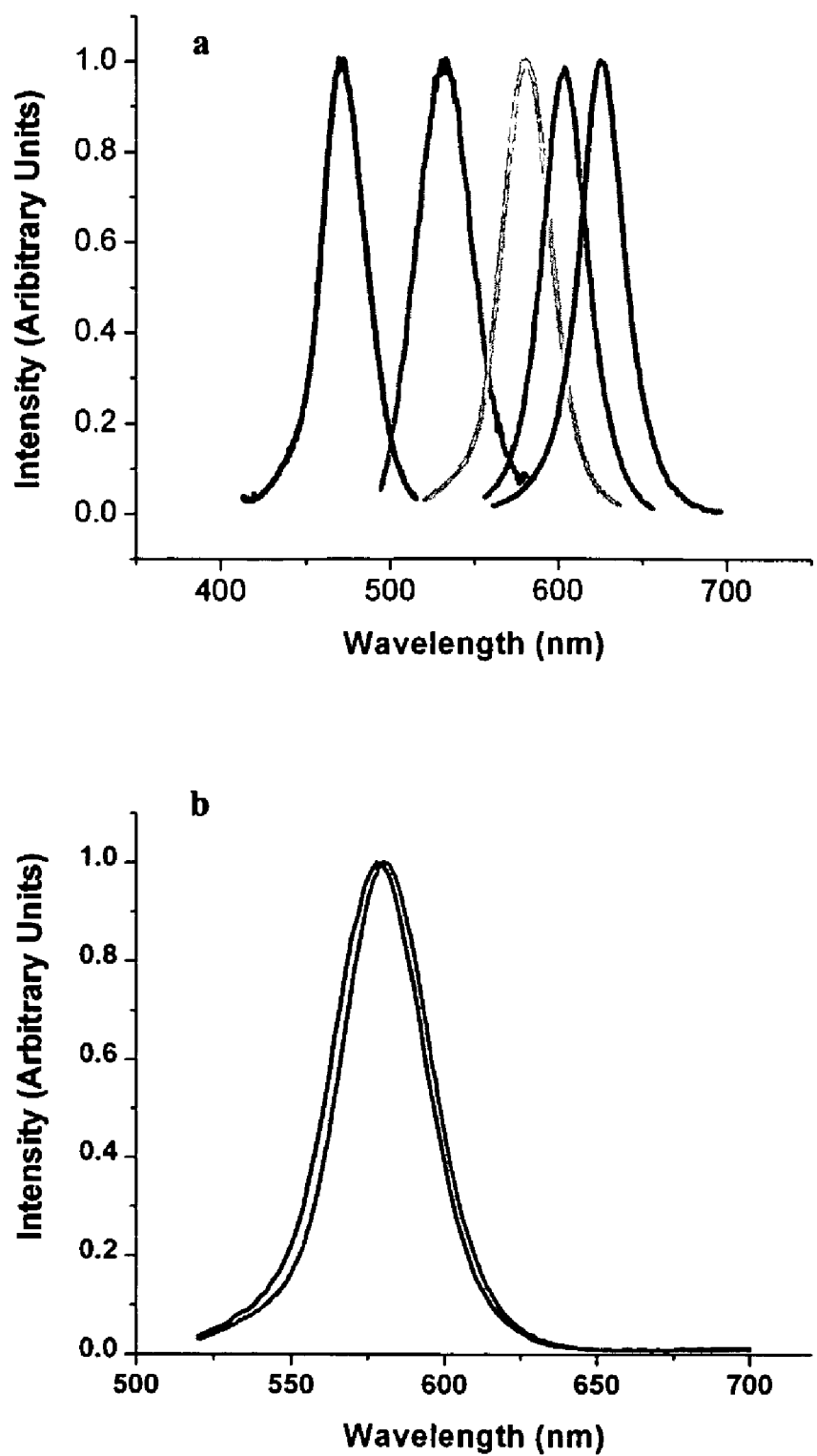
FIGS. 4a and 4b are photoluminescence spectra of microspheres.

FIG. 2b shows a TEM image of a distribution of silica microspheres with CdSe/ZnS nanocrystals localized in the peripheral regions of the microspheres. The inset of FIG. 2b shows a microsphere from the same distribution imaged at a higher magnification to highlight the smooth morphology of these silica/silica-nanocrystal microspheres. The size dispersities of samples were quantified. The diameters of ~200 spheres were obtained from scanned TEM images processed using Image J (Version 1.30, July 2003, Wayne Rasband, National Institutes of Health) and tabulated. The size dispersity (the standard deviation divided by the mean sphere diameter) was subsequently evaluated as such for all samples reported. FIG. 2c shows the size dispersity of the sample from FIG. 2b, along with that of the starting microspheres, illustrating that the size dispersity of microspheres does not significantly change upon growth of a peripheral layer. The thickness of the peripheral layer cannot be determined by simply taking the difference in mean diameters between the microspheres before and after peripheral layer growth, because the microspheres can shrink as a result of condensation of unreacted Si—OH groups when they are re-dispersed in a basic solution for overcoating. See, e.g., C. J. Brinker, and G. W. Scherer, "Sol-gel Science—The Physics and Chemistry of Sol-gel Processing", Academic Press, Boston 1990, which is incorporated by reference in its entirety. A range of concentrations of nanocrystals can be used (such as $1\times10^{-4}$ mmol/L to $8\times10^{-4}$ mmol/L) without perturbing the peripheral layer growth process, but it is likely that extremely high concentrations of nanocrystals can result in agglomeration of nanocrystals and crosslinking of spheres due to the large excess of APS in solution. The peripheral layer growth process can allow the incorporation of different color-emitting nanocrystals into silica microspheres. Silica microspheres can have diameters ranging from, e.g., 100 nanometers to 500 micrometers, 150 nanometers to 100 micrometers, 150 nanometers to 10 micrometers, or 154 nanometers to 954 nanometers after overcoating. See FIG. 3, which displays fluorescence micrographs of (a) 154 nm (±6.6%) diameter microspheres with nanocrystals emitting at 604 nm; (b) 295 nm (±4.1%) diameter microspheres with nanocrystals emitting at 580 nm; (c) 609 nm (±2.5%) diameter microspheres with nanocrystals emitting at 531 nm; and (d) 954 nm (±2.7%) diameter microspheres with nanocrystals emitting at 625 nm. The insets of FIGS. 3a–3d are TEM images of the microspheres. A peripheral layer can be grown on commercially available silica microspheres by the method. The peripheral layer growth conditions can be fine tuned with respect to the size of the microsphere so that the nanocrystals are introduced under silica shell growth conditions, rather than silica nucleation conditions. The slower kinetics of silica growth permits greater control of nanocrystal incorporation and preserves the size monodispersity of the final microsphere composites. The emission spectra of microspheres incorporating semiconductor nanocrystals are shown in FIG. 4a. The microspheres were dispersed in an index-matched liquid. FIG. 4b, which presents emission spectra of 3.8 nm CdSe/ZnS nanocrystals in hexane before incorporation (peak at 578 nm) and incorporated into microspheres suspended in an index-matching liquid after overcoating (peak at 580 nm). The incorporation process did not result in significant broadening or any deep trap emission from the nanocrystals, unlike the results reported in M. A. Correa-Duarte, et al., Chem. Phys. Lett. 1998, 286, 497, which is incorporated by reference in its entirety.

The quantity of nanocrystals incorporated into the silica peripheral layer was estimated by first acquiring the absorption spectrum of a known weight of overcoated microspheres. This yielded the total number of nanocrystals and microspheres. See, for example, C. A. Leatherdale, et al., J. Phys. Chem. B 2002, 106, 7619, which is incorporated by reference in its entirety. The microspheres were immersed in a refractive index matching liquid (a mixture of ethanol, n=1.36, and toluene, n=1.49), in order to minimize effects from light scattering by the microspheres. The reported density of Stöber silica microspheres is 2.03 g/cm$^3$, with a corresponding index of refraction of 1.46 (see, for example, A. van Blaaderen, and A. Vrij, Langmuir 1992, 8, 2921). This agreed with the refractive index determined for the microspheres after peripheral layer growth. Use of this reported density allowed quantification of the number of nanocrystals per microsphere. As an example, the 295 nm microspheres in FIG. 3b contained ~1200 nanocrystals per microsphere (~0.3% volume fraction). Knowing the number density of nanocrystals in spheres also enabled determination of the quantum yield within the sphere, and quantum yields as high as 13% were obtained.

The quantum yield was determined as follows: the optical densities of the index-matched spheres in a toluene/ethanol mixture and an appropriate reference dye in methanol were closely matched at the wavelength of excitation. To ensure that no reabsorption of the dye emission occurs, the optical densities were always maintained at a value below 0.1 at the excitation wavelength. The photoluminescence spectra of both the sample of spheres and the reference dye were acquired using a SPEX Fluorolog 1680 spectrometer. Comparison of their corresponding integrated emission allowed the quantum yield of the sample to be determined. Although the quantum yields of as-synthesized core-shell CdSe/ZnS nanocrystals used were as high as 38%, subsequent loss of the original surface ligands due to cap-exchange with AP and APS can lead to diminished quantum yields. Furthermore, the decline in the quantum yield due to processing is very dependent on the quality and thickness of the ZnS shell on the nanocrystals, which can vary from sample to sample.

The photostability of the nanocrystals (~3.8 nm diameter) in the silica microspheres was evaluated using a 514 nm excitation source from a CW Ar$^+$laser focused through a 0.95 NA air objective at an intensity of 80 W/cm$^2$. No appreciable decrease in the fluorescence intensity was seen over a period of 20 minutes, suggesting that little, if any, photobleaching occurred.

Although the spatial distribution of the nanocrystals within the silica shell could not easily be imaged directly via TEM, WDS measurements on a number of randomly chosen individual microspheres indicate a uniform distribution of nanocrystals from sphere to sphere, with an average Se to Si elemental mass ratio of 0.026±13% (the standard deviation is more significant than the absolute value of the ratio due to the curvature of the microsphere, which may introduce inherent systematic error into the WDS measurement). This result suggested that the nanocrystals are not aggregated, and are likely evenly distributed throughout the shell. The slight 2 nm red shift in the emission spectrum of incorporated nanocrystals, as seen in FIG. 4b, is further evidence for non-aggregation of nanocrystals. Moreover, characterization of microspheres using high resolution TEM revealed a relatively smooth surface morphology with no apparent nanocrystals localized on the surface, consistent with the nanocrystals not existing in an aggregated form inside the microsphere.

Figure 5:
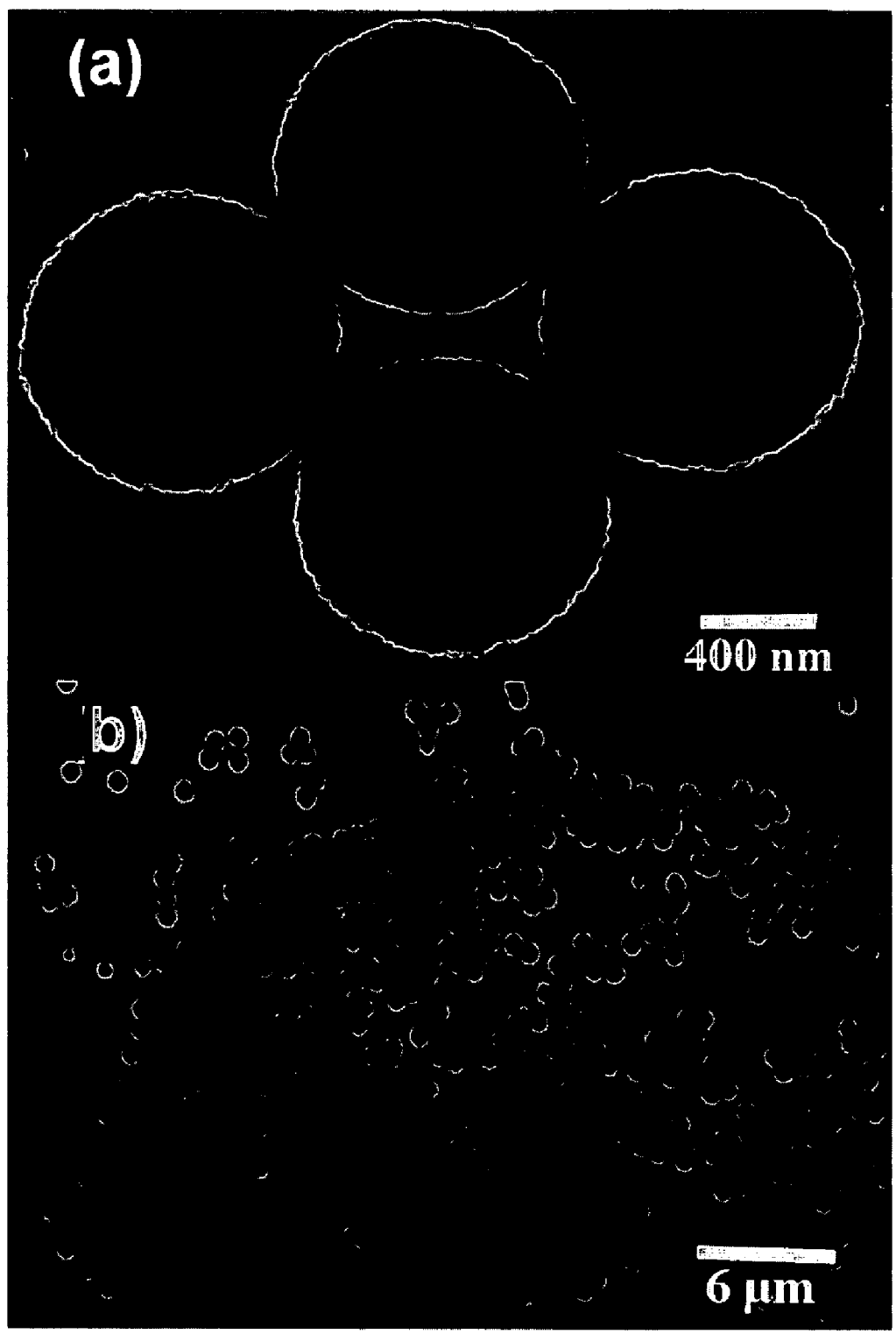
FIG. 5a is a TEM image of microspheres.
FIG. 5b is a fluorescence micrograph of microspheres.

An amorphous titania peripheral layer including CdSe/ZnS core-shell nanocrystals was grown on silica microspheres. The procedure closely resembles that for growing a silica peripheral layer on microspheres, with slight modifications as described below. Fluorescence microscopy and TEM images of silica microspheres with a titania/nanocrystal peripheral layer are provided in FIG. 5. Unlike the silica peripheral layer silica microspheres, the difference in composition between the titania peripheral layer and the silica particle gives enough contrast on the TEM image to directly determine the thickness of the peripheral layer. The peripheral layer thickness was ~60 nm. The refractive index contrast between the nanocrystal-doped titania peripheral layer and air can permit use of the microspheres as photonic materials. WDS measurements confirmed the uniformity of the distribution of nanocrystals from sphere to sphere, with a Se to Ti elemental mass ratio of 0.019±11%.

EXAMPLES

Silica Peripheral Layer Growth on Microspheres

CdSe and CdS nanocrystals were synthesized and then overcoated with ZnS using previously reported techniques. See, for example, B. R. Fischer, et al., *J. Phys. Chem. B* 2004, 108, 143; J. S. Steckel, et al., *Angew. Chem. Int. Ed.* 2004, 43, 2154; and B. O. Dabbousi, et al., *J. Phys. Chem. B* 1997, 101, 9463, each of which is incorporated by reference in its entirety. The resulting core-shell nanocrystals dispersed in butanol/hexane were then precipitated from solution using excess methanol. Repeating this dispersion/precipitation cycle about three times removes most of the native trioctylphosphine (TOPO) caps, leaving a powder which was dried under vacuum and brought into a nitrogen-atmosphere box for subsequent cap-exchange with AP and APS. As an example, ~135 mg of CdSe/ZnS nanocrystals (about 4.0 nm in diameter) was mixed with 1000 mg of anhydrous ethanol and 150 mg of APS, forming a suspension of nanocrystals. Addition of 60 mg of AP resulted in a clear solution which was subsequently heated at ~40° C. for about 30 minutes to ensure cap-exchange with AP and APS. Addition of 10 µL of this nanocrystal solution to 30 mg bare silica microspheres (see below) and 16 mg hydroxypropyl cellulose (avg. $M_w$=370,000) dispersed in 10 mL of vigorously stirring ethanol was followed by the addition of 50 µL $H_2O$, 50 µL $NH_4OH$ (28% in $H_2O$) and 0.15 mL tetraethoxysilane. The mixture was then immersed in an oil bath at 75° C. for 4 hours while stirring. The silica/silica-nanocrystal microspheres were then isolated by 3–4 cycles of centrifugation to precipitate followed by redispersion in ethanol.

Titania Peripheral Layer Growth on Microspheres

Addition of 10 µL of the nanocrystal solution in ethanol described above to 30 mg bare silica microspheres (see below) and 16 mg hydroxypropyl cellulose in 10 mL of stirring ethanol was followed by the addition of 54 µL $H_2O$ and 0.1 mL tetrabutylorthotitanate. The mixture was then immersed in an oil bath at 75° C. for 4 hours while maintaining stirring. The silica/titania-nanocrystal microspheres were then isolated by 3–4 cycles of centrifugation to precipitate followed by re-dispersal in ethanol.

Silica Microspheres

Various sizes (~130–900 nm in diameter) were synthesized by variants of the well known Stöber process. See, for example, G. H. Bogush, et al., *J. Non-Cryst. Solids* 1988, 104, 95; and W. Stöber, et al., *J. Colloid Interface Sci.*, 1968, 26, 62, each of which is incorporated by reference in its entirety. For 130 nm spheres, for example, into a solution of 0.55 mL tetraethoxysilane in 10 mL ethanol, 1 mL $H_2O$ and 0.2 mL $NH_4OH$ (28% in $H_2O$) were rapidly injected under vigorous stirring. Stirring was continued for 3 or more hours. The resulting microspheres were then isolated from excess reagents by 3 cycles of centrifugation followed by re-dispersal in ethanol.

In Vivo Imaging

Figure 6:
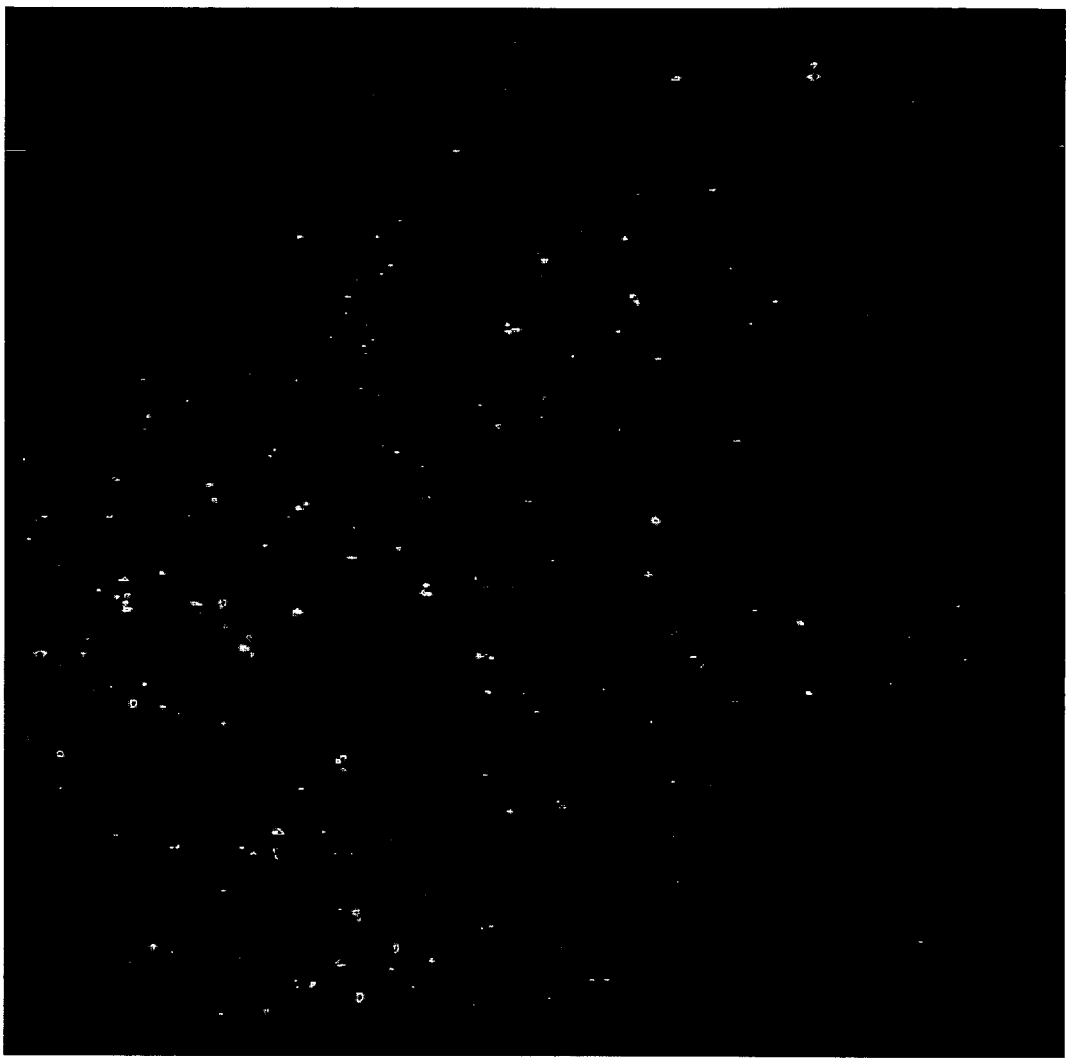
FIG. 6 is a fluorescence micrograph of microspheres in the blood vessels of a mouse.

The microspheres can be used for in vivo imaging. Microspheres of two distinct diameters were labeled with semiconductor nanocrystals of different emission wavelengths and administered via carotid artery injection to a mouse bearing a cranial window and expressing the green fluorescent protein (GFP) in vascular endothelial cells (Tie2-GFP mouse). See, for example, R. J. Melder, et al., *Microvasc. Res.* 1995, 50, 35; and T. Motoike, et al., *Genesis* 2000, 28, 75, each of which is incorporated by reference in its entirety. The microspheres were coated with polyethylene glycol (PEG) to increase residence times in the blood vessels. Circulating microspheres were imaged by using multiphoton microscopy (MPM) using 800 nm light delivered through a 20X, 0.9 NA water-immersion lens (see, for example, E. B. Brown, et al., *Nat. Med.* 2001, 7, 864, which is incorporated by reference in its entirety). Circulating microspheres could be tracked using MPM intravitally. See FIG. 6. The ability to track distinct microspheres of multiple well-defined sizes and colors simultaneously provides crucial information regarding flow characteristics in blood vessels, which can in turn guide drug delivery strategies (see R. K. Jain, *Nat. Med.* 1998, 4, 655, which is incorporated by reference in its entirety). The monodispersity of the microspheres allows for similar sized spheres (diameters of 400 nm and 500 nm, for example) having different emission wavelengths to be utilized and reliably distinguished in biological experiments in which sub-micron sizes are important. See, e.g., S. K. Hobbs, et al., *Proc. Natl. Acad. Sci.* 1998, 95, 4607; and S. L. Hale, et al., *Am. J. Physiol. Heart. Circ. Physiol.* 1986, 251, H863, each of which is incorporated by reference in its entirety. Moreover, the favorable optical properties of high-quality semiconductor nanocrystals, in particular the simultaneous excitation of different-colored nanocrystals, narrow emission profiles, and high photostability, can be harnessed for biological imaging applications inaccessible to organic dye-doped submicron spheres.

Other embodiments are within the scope of the following claims.

What is claimed is:

1. A microsphere comprising:
a central region including a first matrix material; and
a first peripheral layer on a surface of the central region, the first peripheral layer including a second matrix material different from the first matrix material and including a first nanoparticle dispersed within the layer, wherein the first nanoparticle is covalently linked to the first peripheral layer.

2. The microsphere of claim 1, wherein the central region includes an inorganic material.

3. The microsphere of claim 2, wherein the central region includes silicon.

4. The microsphere of claim 1, wherein the first peripheral layer includes an inorganic material.

5. The microsphere of claim 4, wherein the first peripheral layer includes silicon or titanium.

6. The microsphere of claim 1, wherein the microsphere has a diameter of less than 500 micrometers.

7. The microsphere of claim 1, wherein the microsphere has a diameter of less than 10 micrometers.

8. The microsphere of claim 1, wherein the microsphere has a diameter of less than 1 micrometer.

9. The microsphere of claim 1, wherein the central region is substantially free of nanoparticles.

10. The microsphere of claim 1, wherein the first nanoparticle is a metal nanoparticle, a metal oxide nanocrystal, or a semiconductor nanocrystal.

11. The microsphere of claim 1, wherein the first nanoparticle is a semiconductor nanocrystal.

12. The microsphere of claim 11, wherein the semiconductor nanocrystal includes a core including a first semiconductor material.

13. The microsphere of claim 12, wherein the semiconductor nanocrystal further includes a shell overcoating the core, the shell including a second semiconductor material.

14. The microsphere of claim 13, wherein the first semiconductor material is a Group II-VI compound, a Group II-V compound, a Group III-VI compound, a Group III-V compound, a Group IV-VI compound, a Group I-III-VI compound, a Group II-IV-VI compound, or a Group II-IV-V compound.

15. The microsphere of claim 14, wherein the first semiconductor material is ZnS, ZnSe, ZnTe, CdS, CdSe, CdTe, HgS, HgSe, HgTe, AlN, AlP, AlAs, AlSb, GaN, GaP, GaAs, GaSh, GaSe, InN, InP, InAs, InSb, TlN, TlP, TlAs, TlSb, PbS, PbSe, PbTe, or mixtures thereof.

16. The microsphere of claim 15, wherein the second semiconductor material is ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof.

17. The microsphere of claim 11, wherein the microsphere includes a plurality of semiconductor nanocrystals having a rms deviation in diameter of no greater than 5%.

18. The microsphere of claim 1, wherein the central region is substantially spherical in shape.

19. The microsphere of claim 1, wherein the microsphere is a member of a population of microsphere having a rms deviation in diameter of no greater than 10%.

* * * * *

UNITED STATES PATENT AND TRADEMARK OFFICE
CERTIFICATE OF CORRECTION

| | | |
|---|---|---|
| PATENT NO. | : 7,229,690 B2 | Page 1 of 1 |
| APPLICATION NO. | : 10/898554 | |
| DATED | : June 12, 2007 | |
| INVENTOR(S) | : Chan et al. | |

It is certified that error appears in the above-identified patent and that said Letters Patent is hereby corrected as shown below:

Col. 1 lines 6-9
In the section FEDERALLY SPONSORED RESEARCH OR DEVELOPMENT, the text "The U.S. Government may have certain rights in this invention pursuant to Grant No. DMR-98-1328 awarded by the National Science Foundation and Grant No. NSF-CRC CHE-0209898." should read -- This invention was made with Government support under Grant Nos. DMR0213282 and CHE0209898 awarded by the National Science Foundation. The government has certain rights in this invention. --

Signed and Sealed this
Tenth Day of May, 2011

David J. Kappos
*Director of the United States Patent and Trademark Office*